(12) United States Patent
Zhang et al.

(10) Patent No.: US 9,609,648 B2
(45) Date of Patent: Mar. 28, 2017

(54) BEAMFORM SCHEDULING BASED ON THE DIRECTIONALITY OF UES

(71) Applicant: QUALCOMM Incorporated, San Diego, CA (US)

(72) Inventors: Zhenliang Zhang, Somerset, NJ (US); Sundar Subramanian, Bridgewater, NJ (US); Junyi Li, Chester, NJ (US); Ashwin Sampath, Skillman, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 229 days.

(21) Appl. No.: 14/306,120

(22) Filed: Jun. 16, 2014

(65) Prior Publication Data

US 2015/0365939 A1 Dec. 17, 2015

(51) Int. Cl.
*H04W 72/04* (2009.01)
*H04L 5/00* (2006.01)
*H04B 7/06* (2006.01)

(52) U.S. Cl.
CPC ...... *H04W 72/0446* (2013.01); *H04B 7/0617* (2013.01); *H04L 5/0037* (2013.01); *H04W 72/046* (2013.01)

(58) Field of Classification Search
None
See application file for complete search history.

(56) References Cited

U.S. PATENT DOCUMENTS

| 6,836,674 | B2 | 12/2004 | Taniguchi et al. |
| 7,620,019 | B1 | 11/2009 | Smith et al. |
| 8,295,228 | B2 | 10/2012 | Tangemann |
| 8,665,832 | B2 | 3/2014 | Dateki |
| 2003/0181163 | A1* | 9/2003 | Ofuji ............ H01Q 1/1257 455/25 |

(Continued)

FOREIGN PATENT DOCUMENTS

| EP | 1335618 A2 | 8/2003 |
| WO | 2008019706 A1 | 2/2008 |

OTHER PUBLICATIONS

International Search Report and Written Opinion—PCT/US2015/034518—ISA/EPO—Sep. 10, 2015.

*Primary Examiner* — Chirag Shah
*Assistant Examiner* — Srinivasa Reddivalam
(74) *Attorney, Agent, or Firm* — Arent Fox LLP

(57) ABSTRACT

A method, an apparatus, and a computer program product for beamforming in a wireless communication are provided. The apparatus determines a beamforming direction and a SNR of at least two user equipments (UEs) and determines whether to schedule communication with the at least two UEs during a same time interval via a single communication beam based on the beamforming directions and the SNRs of the at least two UEs. When the communication with the at least two UEs during the same time interval via the single communication beam is scheduled, the apparatus allocates bandwidth resources respectively among the at least two UEs, sizes a width of the single communication beam to encompass the beamforming directions of the at least two UEs, and communicates with one or more of the at least two UEs during the same time interval via a respectively allocated bandwidth resource using the sized single communication beam.

22 Claims, 11 Drawing Sheets

(56) References Cited

U.S. PATENT DOCUMENTS

| | | | | |
|---|---|---|---|---|
| 2004/0235529 A1* | 11/2004 | Tarokh | .................. | H01Q 1/246 455/562.1 |
| 2010/0144282 A1* | 6/2010 | Laroia | .................. | H04B 7/0626 455/63.3 |
| 2010/0165914 A1 | 7/2010 | Cho et al. | | |
| 2013/0183992 A1* | 7/2013 | Laroia | .................. | H04B 7/0617 455/452.1 |

* cited by examiner

BEAMFORM SCHEDULING BASED ON THE DIRECTIONALITY OF UES

BACKGROUND

Field

The present disclosure relates generally to communication systems, and more particularly, to dividing a bandwidth and adjusting a communication beam width to improve bandwidth efficiency and efficiently schedule communication with multiple UEs during a same time interval.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus for beamforming in a wireless communication are provided. The apparatus determines a beamforming direction and a signal-to-noise ratio (SNR) of at least two user equipments (UEs) and determines whether to schedule communication with the at least two UEs during a same time interval via a single communication beam based on the beamforming directions and the SNRs of the at least two UEs. When the communication with the at least two UEs during the same time interval via the single communication beam is scheduled, the apparatus allocates bandwidth resources respectively among the at least two UEs, sizes a width of the single communication beam to encompass the beamforming directions of the at least two UEs, and communicates with one or more of the at least two UEs during the same time interval via a respectively allocated bandwidth resource using the sized single communication beam.

DETAILED DESCRIPTION

Figure 1:
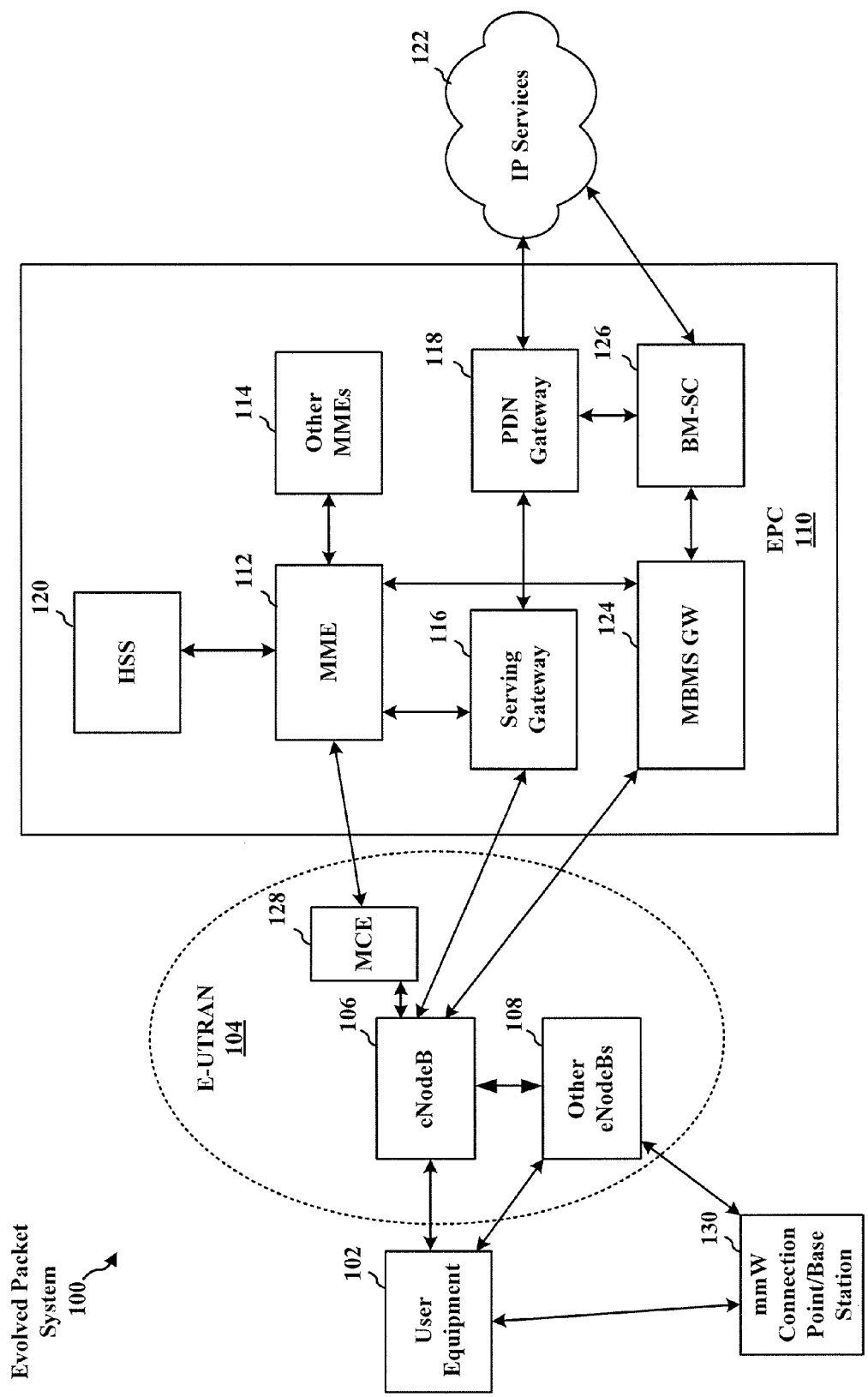
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating a network architecture (e.g., LTE network architecture) 100. The network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link. Discovery techniques in a directional wireless network such as EPS 100 between a UE 102 and CP 130 is discussed in further detail infra.

Figure 2:
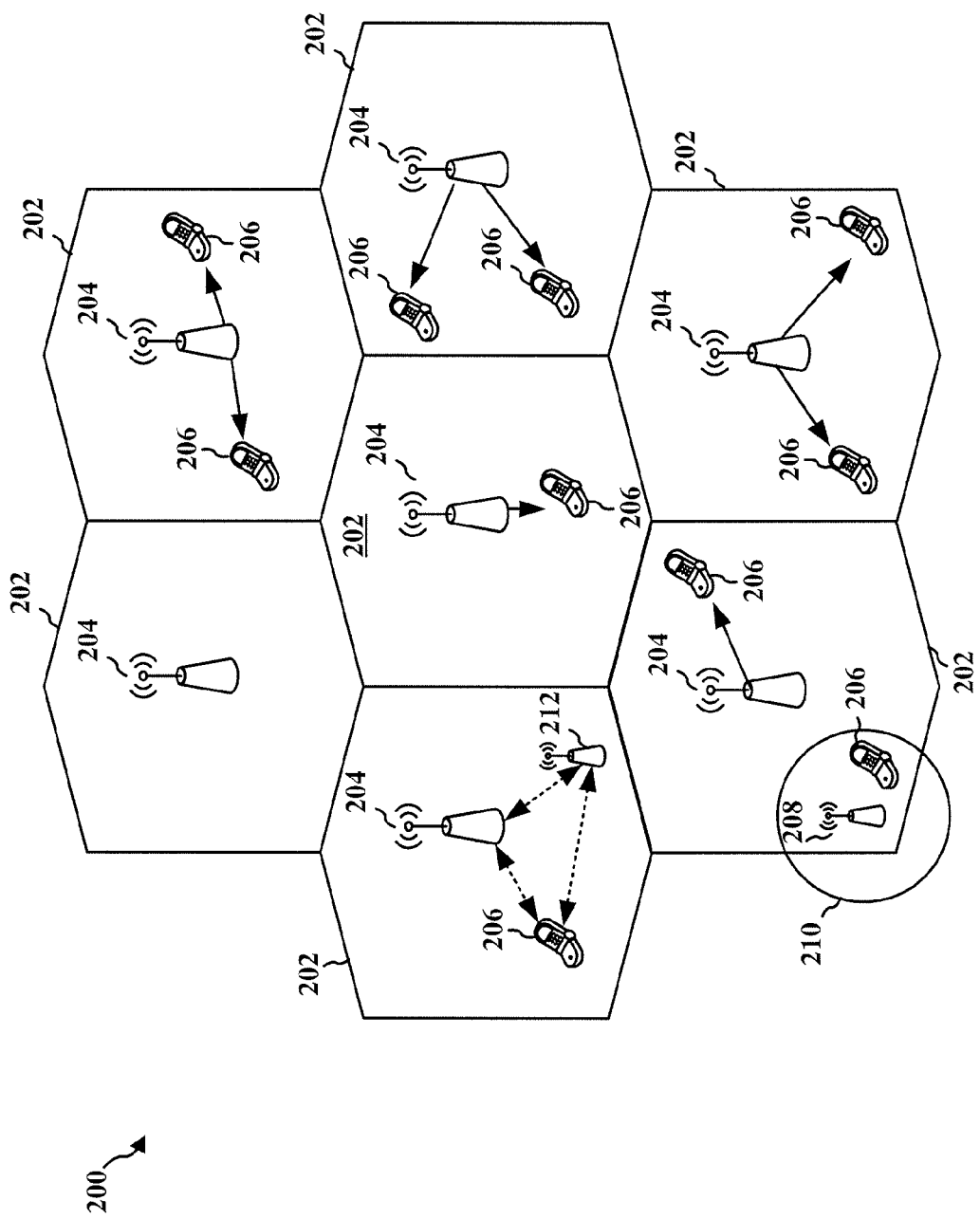
FIG. 2 is a diagram illustrating an example of an access network.

FIG. 2 is a diagram illustrating an example of an access network 200 in a network architecture (e.g., LTE network architecture). In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
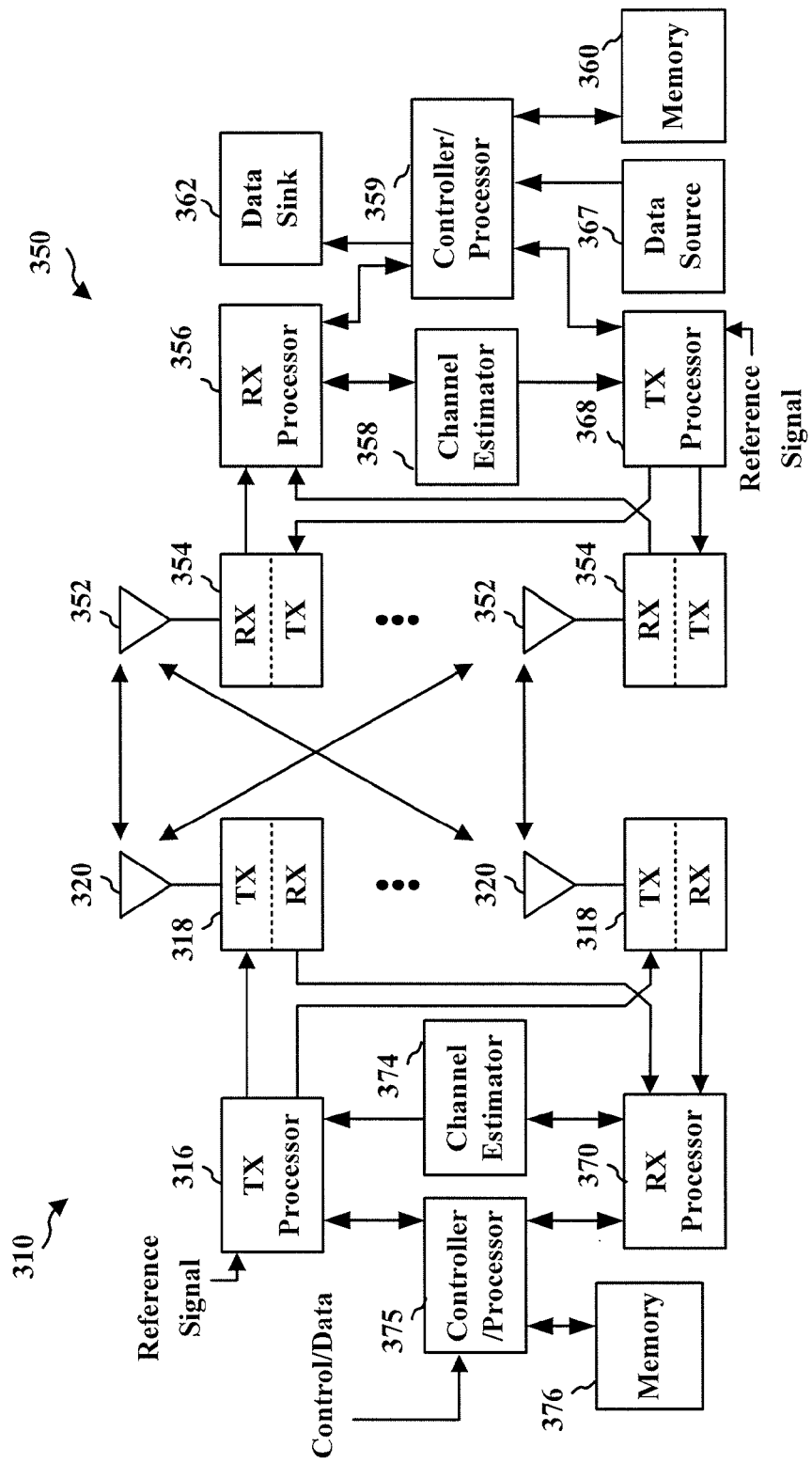
FIG. 3 is a diagram illustrating an example of an evolved Node B and user equipment in an access network.

FIG. 3 is a block diagram of a base station 310 in communication with a UE 350 in an access network. The base station 310 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 350 may be capable of communicating signals via the LTE system and/or the mmW system. In the DL, upper layer packets from the core network are provided to a controller/processor 375. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions. The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362. Various control signals may also be provided to the data sink 362 for processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. Similar to the functionality described in connection with the DL transmission by the base station 310, the controller/processor 359 provides header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming. A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure may exploit the presence of a more robust system to help with beamforming, synchronization, or discovery of a base station. Cooperation between the mmW system and a lower-frequency system (e.g., LTE) may be facilitated by the following: 1) Types of signaling in support of discovery, synchronization, or association on a mmW channel can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by base stations (BSs)/user equipments (UEs) in a transmitted message; and 5) Information to be included in LTE signaling.

In an aspect, mmW-capable connection points (CPs) or base stations (BSs) (network access points for mmW-capable devices) may be mounted on light poles, building sides, and/or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 4A:
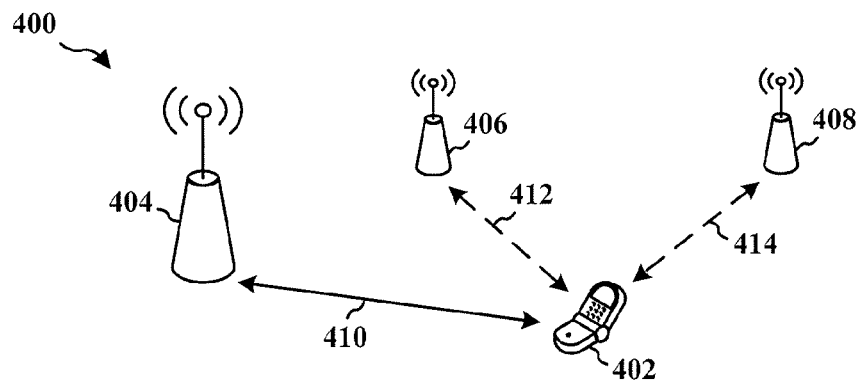
FIGS. 4A to 4C are diagrams illustrating example deployments of a mmW system used in conjunction with a LTE system.
Figure 4B:
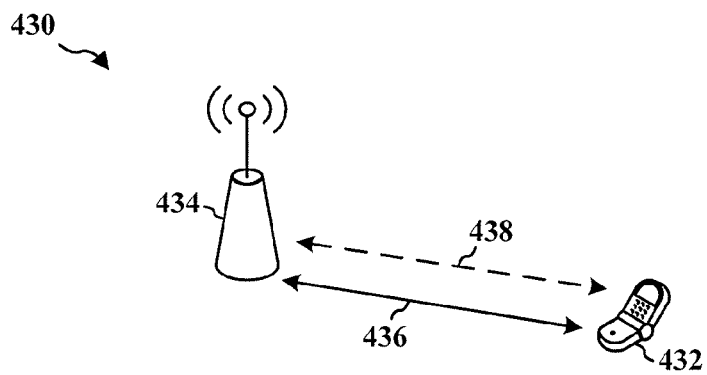
Figure 4C:
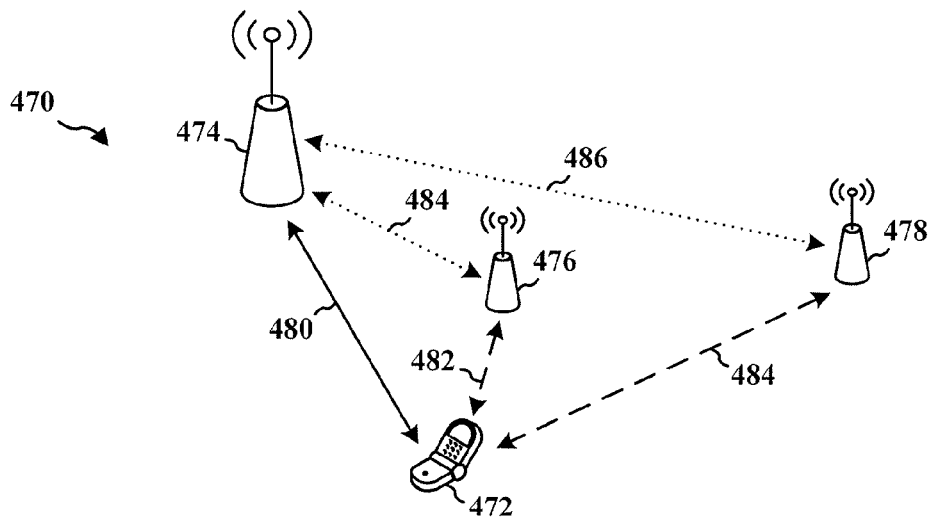

FIGS. 4A to 4C are diagrams illustrating example deployments of a mmW system used in conjunction with a LTE system. In FIG. 4A, diagram 400 illustrates a deployment where a LTE system operates independently of, and in parallel with, a mmW system. As shown in FIG. 4A, a UE 402 is capable of communicating signals via a LTE system and a mmW system. Accordingly, the UE 402 may communicate with a eNB 404 over a LTE link 410. In parallel with the LTE link 410, the UE 402 may also communicate with a first BS 406 over a first mmW link 412 and communicate with a second BS 408 over a second mmW link 414.

In FIG. 4B, diagram 430 illustrates a deployment where the LTE system and the mmW system are collocated. As shown in FIG. 4B, a UE 432 is capable of communicating signals via the LTE system and the mmW system. In an aspect, a BS 434 may be an LTE eNB capable of communicating signals via the LTE system and the mmW system. As such, the BS 434 may be referred to as a LTE+mmW eNB. In another aspect, the BS 434 may be a mmW CP capable of communicating signals via the LTE system and the mmW system. As such, the BS 434 may be referred to as a LTE+mmW BS. The UE 432 may communicate with the BS 434 over a LTE link 436. Meanwhile, the UE 432 may also communicate with the BS 434 over a mmW link 438.

In FIG. 4C, diagram 470 illustrates a deployment where a BS capable of communicating signals via the LTE system and the mmW system (LTE+mmW base station) is present with BSs capable of communicating signals via the mmW system only. As shown in FIG. 4C, a UE 472 may communicate with a LTE+mmW BS 474 over a LTE link 480. The LTE+mmW BS 474 may be a LTE+mmW eNB. In parallel with the LTE link 480, the UE 472 may also communicate with a second BS 476 over a first mmW link 482 and communicate with a third BS 478 over a second mmW link 484. The second BS 476 may further communicate with the LTE+mmW BS 474 over a first mmW backhaul link 484. The third BS 478 may further communicate with the LTE+mmW BS 474 over a second mmW backhaul link 486.

Figure 5A:
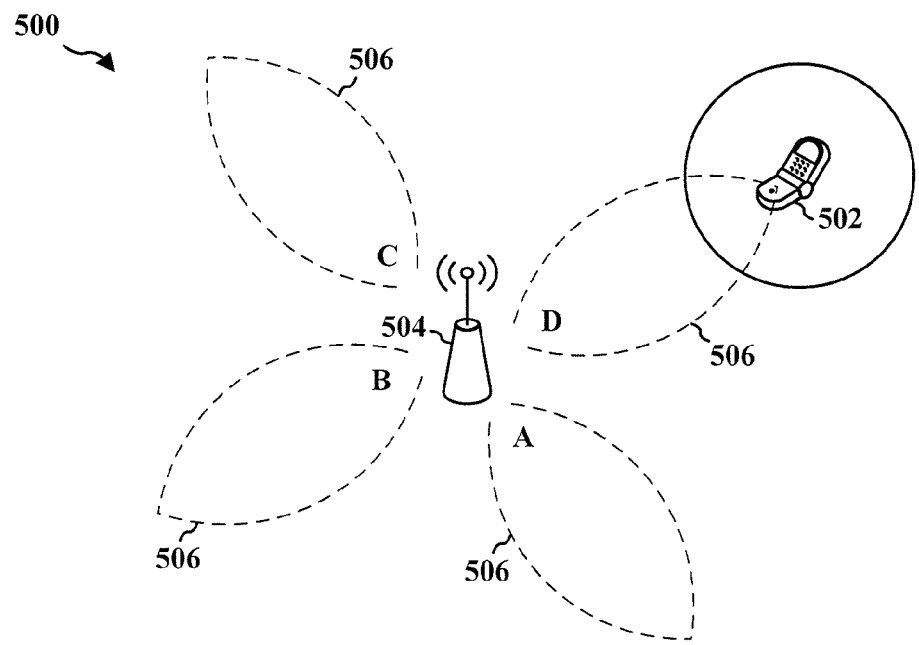
FIGS. 5A and 5B are diagrams illustrating an example of the transmission of beamformed signals between a connection point and a UE.
Figure 5B:
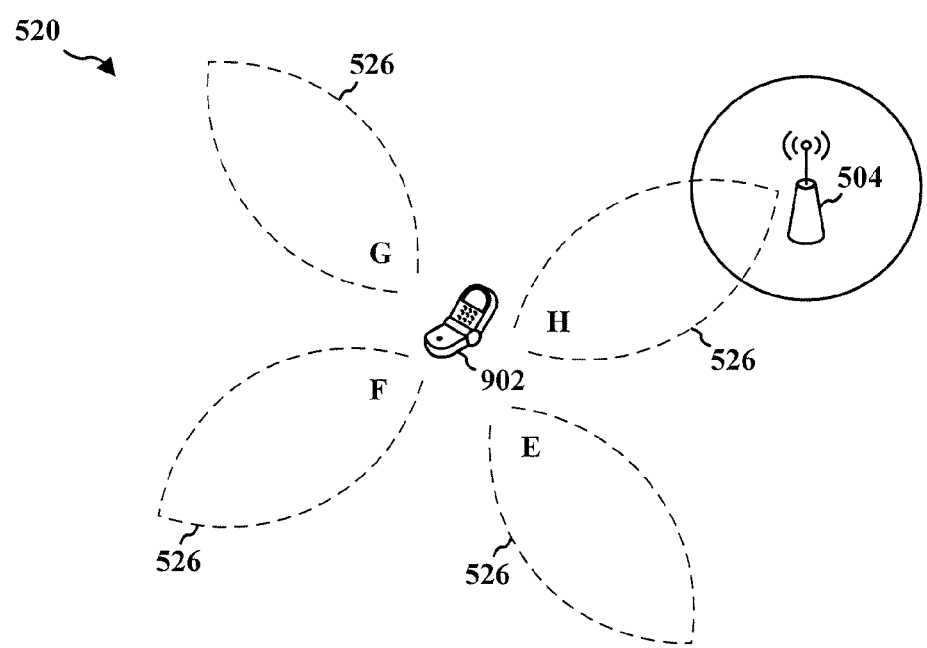

FIGS. 5A and 5B are diagrams illustrating an example of the transmission of beamformed signals between a CP and a UE. The CP may be embodied as a BS in a mmW system (mmW BS). Referring to FIG. 5A, diagram 500 illustrates a CP 504 of a mmW system transmitting beamformed signals 506 (e.g., synchronization signals or discovery signals) in different transmit directions (e.g., directions A, B, C, and D). In an example, the CP 504 may sweep through the transmit directions according to a sequence A-B-C-D. In another example, the CP 504 may sweep through the transmit directions according to the sequence B-D-A-C. Although only four transmit directions and two transmit sequences are described with respect to FIG. 5A, any number of different transmit directions and transmit sequences are contemplated.

After transmitting the signals, the CP 504 may switch to a receive mode. In the receive mode, the CP 504 may sweep through different receive directions in a sequence or pattern corresponding (mapping) to a sequence or pattern in which the CP 504 previously transmitted the synchronization/discovery signals in the different transmit directions. For example, if the CP 504 previously transmitted the synchronization/discovery signals in transmit directions according to the sequence A-B-C-D, then the CP 504 may sweep through receive directions according to the sequence A-B-C-D in an attempt to receive an association signal from a UE 502. In another example, if the CP 504 previously transmitted the synchronization/discovery signals in transmit directions according to the sequence B-D-A-C, then the CP 504 may sweep through receive directions according to the sequence B-D-A-C in an attempt to receive the association signal from the UE 502.

A propagation delay on each beamformed signal allows a UE 502 to perform a receive (RX) sweep. The UE 502 in a receive mode may sweep through different receive directions in an attempt to detect a synchronization/discovery signal 506 (see FIG. 5B). One or more of the synchronization/discovery signals 506 may be detected by the UE 502. When a strong synchronization/discovery signal 506 is detected, the UE 502 may determine an optimal transmit direction of the CP 504 and an optimal receive direction of the UE 502 corresponding to the strong synchronization/discovery signal. For example, the UE 502 may determine preliminary antenna weights/directions of the strong synchronization/discovery signal 506, and may further determine a time and/or resource where the CP 504 is expected to optimally receive a beamformed signal. Thereafter, the UE 502 may attempt to associate with the CP 504 via a beamformed signal.

Referring to diagram 520 of FIG. 5B, the UE 502 may listen for beamformed discovery signals in different receive directions (e.g., directions E, F, G, and H). In an example, the UE 502 may sweep through the receive directions according to a sequence E-F-G-H. In another example, the UE 502 may sweep through the receive directions according to the sequence F-H-E-J. Although only four receive directions and two receive sequences are described with respect to FIG. 5B, any number of different receive directions and receive sequences are contemplated.

The UE 502 may attempt the association by transmitting beamformed signals 526 (e.g., association signals) in the different transmit directions (e.g., directions E, F, G, and H). In an aspect, the UE 502 may transmit an association signal 526 by transmitting along the optimal receive direction of the UE 502 at the time/resource where the CP 504 is expected to optimally receive the association signal. The CP 504 in the receive mode may sweep through different receive directions and detect the association signal 526 from the UE 502 during one or more timeslots corresponding to a receive direction. When a strong association signal 526 is detected, the CP 504 may determine an optimal transmit direction of the UE 502 and an optimal receive direction of the CP 504 corresponding to the strong association signal. For example, the CP 504 may determine preliminary antenna weights/directions of the strong association signal 526, and may further determine a time and/or resource where the UE 502 is expected to optimally receive a beamformed signal. Any of the processes discussed above with respect to FIGS. 5A and 5B may be refined or repeated over time such that the UE 502 and CP 504 eventually learn the most optimal transmit and receive directions for establishing a link with each other. Such refinement and repetition may be referred to as beam training.

In an aspect, the CP 504 may choose a sequence or pattern for transmitting the synchronization/discovery signals according to a number of beamforming directions. The CP 504 may then transmit the signals for an amount of time long enough for the UE 502 to sweep through a number of beamforming directions in an attempt to detect a synchronization/discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 502 detects a synchronization/discovery signal from the CP 504, the UE 502 may discover that the strongest synchronization/discovery signal is received when the UE 502 beamforming direction is k=2 and the CP 504 beamforming direction is n=3. Accordingly, the UE 502 may use the same antenna weights/directions for responding (transmitting a beamformed signal) to the CP 504 in a corresponding response timeslot. That is, the UE 502 may send a signal to the CP 504 using UE 502 beamforming direction k=2 during a timeslot when the CP 504 is expected to perform a receive sweep at CP 504 beamforming direction n=3.

In a mmW communication system, a mmW CP or mmW base station may schedule resources to communicate with several UEs. The present disclosure provides for adaptive methods for dividing a bandwidth (e.g., involving FDMA and/or OFDMA) and adjusting a communication beam width to improve bandwidth efficiency and efficiently schedule communication with multiple UEs during a same time interval.

Figure 6:
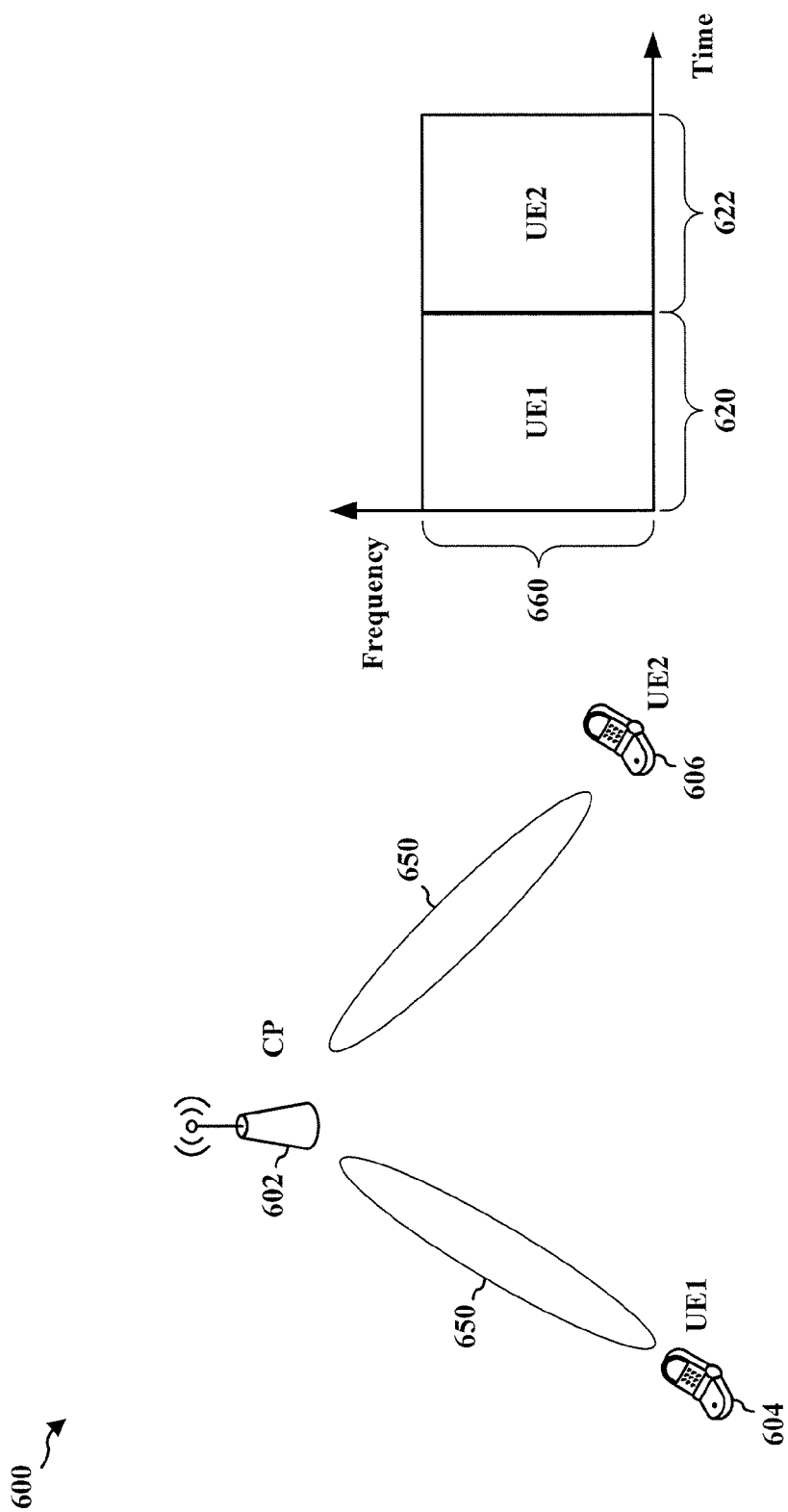
FIG. 6 is a diagram illustrating time division multiple access (TDMA) scheduling.

FIG. 6 is a diagram 600 illustrating time division multiple access (TDMA) scheduling. In an aspect, beamforming (e.g., beamforming according to a MAC protocol of IEEE 802.11ad) may be conducted between a CP and a number of devices (UEs) according to the TDMA structure shown in FIG. 6 using a fixed communication beam width. For example, during a first timeslot 620, a CP 602 may devote an entire bandwidth 660 to communicate with UE1 604 in an uplink and/or downlink direction using a communication beam 650 having a fixed width. Thereafter, the CP 602 may switch a direction of the communication beam 650 to communicate with UE2 606 in an uplink and/or downlink direction during a second timeslot 622. The CP 602 may devote the entire bandwidth 660 for communicating with the UE2 606 during the second timeslot 622.

Figure 7:
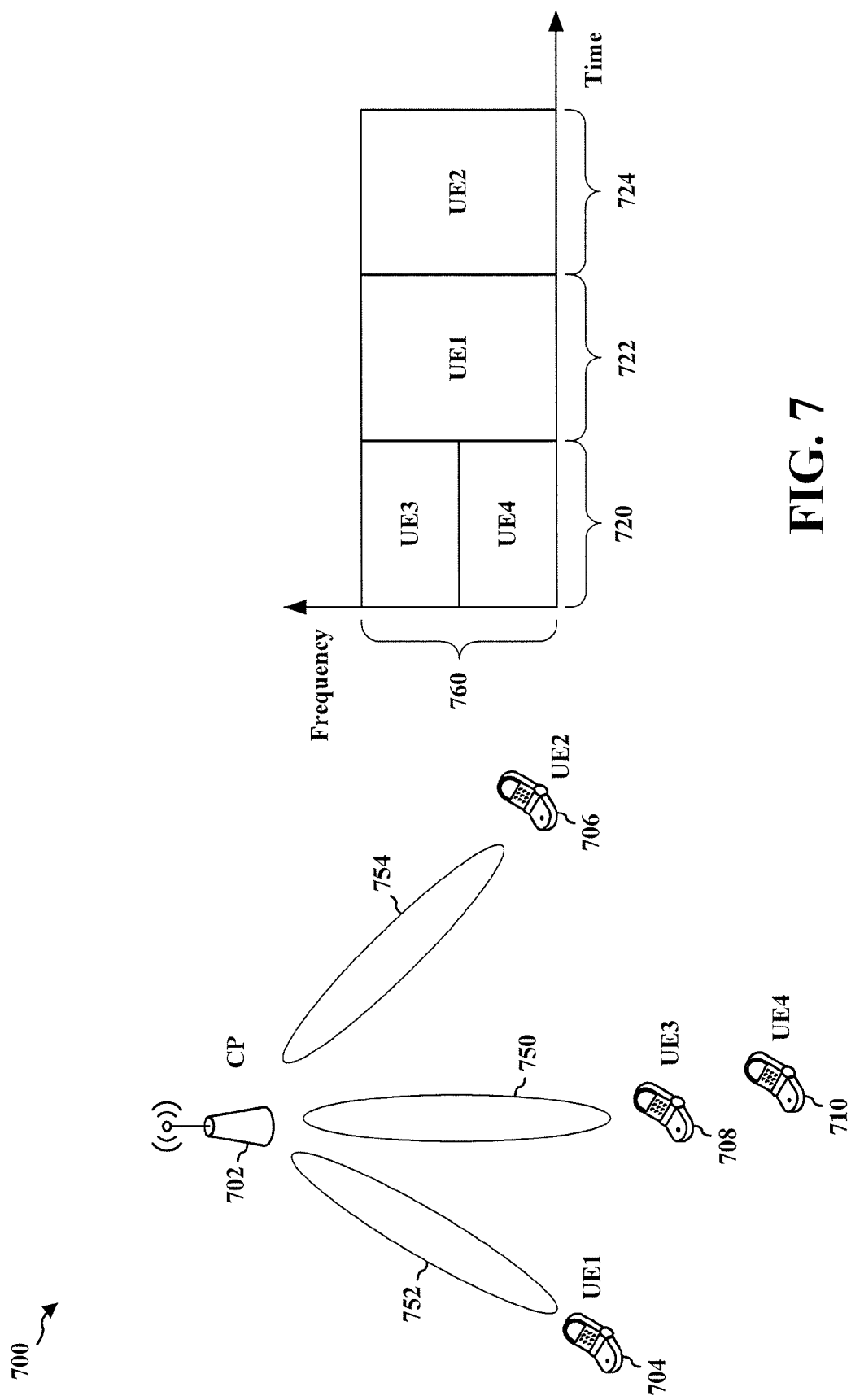
FIG. 7 is a diagram illustrating frequency division multiple access (FDMA) scheduling for multiple UEs using a fixed beam width.

FIG. 7 is a diagram 700 illustrating frequency division multiple access (FDMA) scheduling for multiple UEs using a fixed beam width. In a communication system, two or more UEs may be in near proximity to each other and/or may have the same beamforming directions (e.g., UEs in a densely occupied area). Accordingly, communication with the two UEs having the same beamforming direction may be scheduled together using FDMA/OFDMA techniques to improve bandwidth efficiency. Because of the near proximity to one another, the two UEs benefit from the fact that they are noise limited from interference, and therefore, may not lose much data rate due to a divided bandwidth.

Referring to FIG. 7, in an example downlink operation a CP 702 may be aware of favorable beamforming directions for all nearby UEs (e.g., UE1 704, UE2 706, UE3 708, and UE4 710). The CP 702 may pair the UEs (e.g., UE3 708 and UE4 710) that have similar beamforming directions. For example, the CP 702 may determine whether the UE3 708 has a similar beamforming direction with the UE4 710 by determining whether the beamforming direction of the UE3 708 is within one beam width of the beamforming direction of the UE4 710. Additionally or alternatively, the CP 702 may determine whether the UE3 708 and the UE4 710 have similar beamforming directions by determining whether an angle between the beamforming direction of the UE3 708 and the beamforming direction of the UE4 710 is less than an angle threshold.

Once the CP 702 determines that the UEs have similar beamforming directions and pairs the UEs, the CP 702 may divide bandwidth resources amongst the paired UEs (e.g., using FDMA/OFDMA techniques), and communicate with the UEs using a single communication beam during a same time interval. For example, during a first timeslot 720, the CP 702 may divide a bandwidth 760 between the UE3 708 and the UE4 710, and transmit a downlink signal to the UE3 708 (via bandwidth resources allocated to the UE3 708) and the UE4 710 (via bandwidth resources allocated to the UE4 710) using a communication beam 750 having a fixed width. Accordingly, by using FDMA scheduling for multiple UEs, the CP 702 may save time by not having to switch beam directions when communicating with two UEs (unlike the TDMA operation described in FIG. 6). If the number of UEs is large, FDMA scheduling further allows the CP 702 to save time since one round of scheduling all UEs via FDMA scheduling may conclude in less time than TDMA scheduling.

Still referring to FIG. 7, during at second timeslot 722, the CP 702 may devote the entire bandwidth 760 to communicate with the UE1 704 in an uplink and/or downlink direction using a communication beam 752 having a fixed width. Thereafter, the CP 702 may communicate with the UE2 706 in an uplink and/or downlink direction during a third timeslot 724 using a communication beam 754 having a fixed width. The CP 702 may devote the entire bandwidth 760 for communicating with the UE2 706 during the third timeslot 724.

Figure 8:
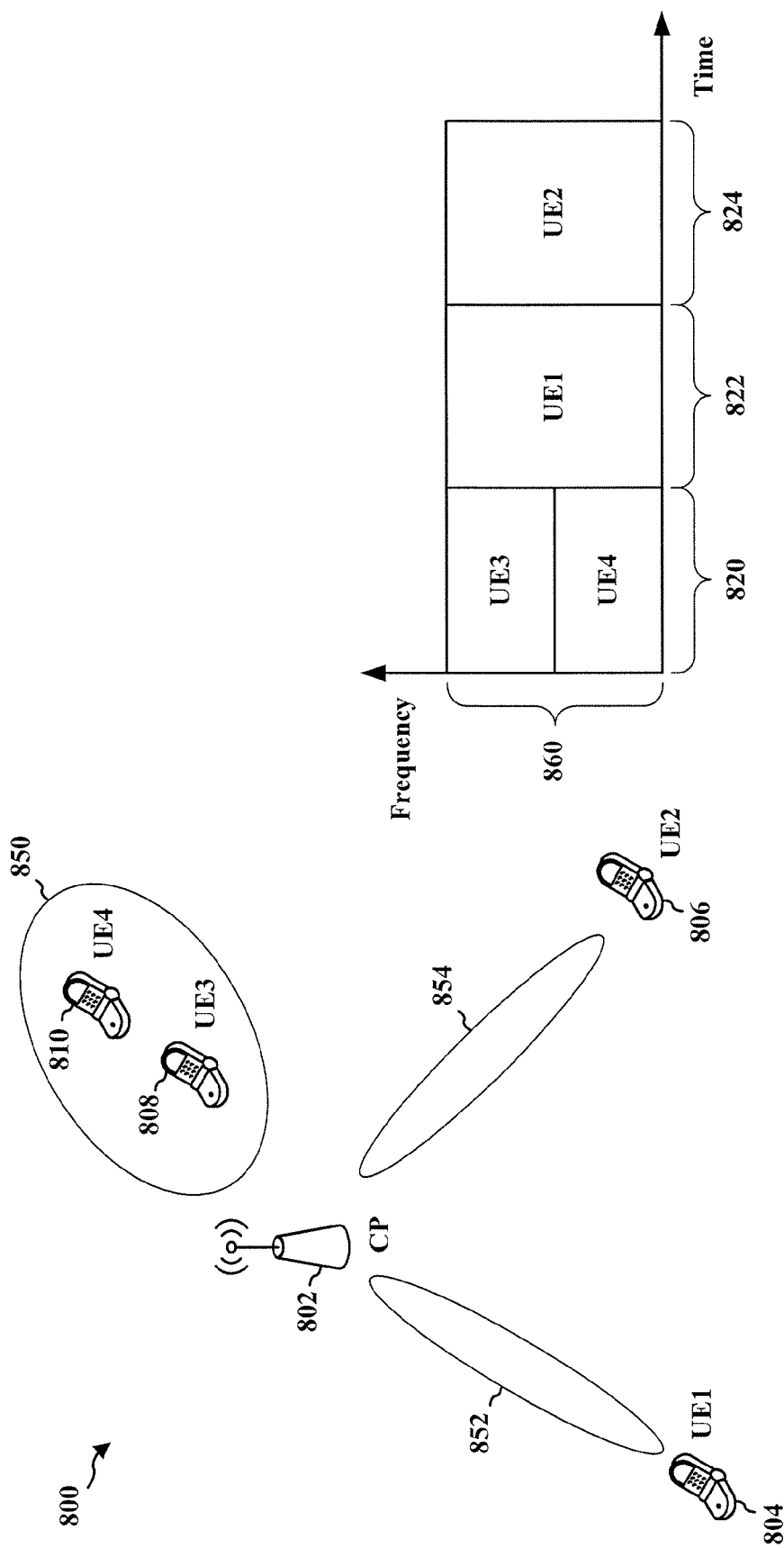
FIG. 8 is a diagram illustrating FDMA scheduling for multiple UEs using an adaptive beam width.

FIG. 8 is a diagram 800 illustrating FDMA scheduling for multiple UEs using an adaptive beam width. In an aspect, some UEs may be in near proximity to a CP (or mmW BS), or have high-quality signal paths. Accordingly, the UEs may be capable of high signal-to-noise ratios (SNRs), e.g., SNRs above an SNR threshold, such that corresponding spectral rates may exceed a maximum spectral efficiency. Hence, it may be wasteful to schedule the high-SNR UEs individually using strong narrow beams. In an aspect, the high-SNR UEs may be scheduled together using a single communication beam to increase bandwidth and scheduling efficiency. A width of the communication beam may be adaptively adjusted in case the beamforming directions of the UEs cannot be covered with a narrow beam.

Referring to FIG. 8, in an example downlink operation a CP 802 may be aware of favorable beamforming directions and SNRs for all nearby UEs (e.g., UE1 804, UE2 806, UE3 808, and UE4 810). The CP 802 may pair the UEs (e.g., UE3 808 and UE4 810) that have sufficiently large SNRs (e.g., SNR above a threshold) and therefore do not require extremely large beamforming gains. Additionally or alternatively, the CP 802 may pair the UEs according to similar beamforming directions. For example, the CP 802 may determine whether the UE3 808 and the UE4 810 have similar beamforming directions by determining whether an angle between the beamforming direction of the UE3 808 and the beamforming direction of the UE4 810 is less than an angle threshold.

Once the CP 802 pairs the UEs, the CP 802 may adjust (size) a width of a communication beam 850 to cover the beamforming directions of the UE3 808 and the UE4 810. The CP 802 may then divide bandwidth resources amongst the paired UEs (e.g., using FDMA/OFDMA techniques), and communicate with the UEs using the communication beam 850 having the adjusted width. For example, during a first timeslot 820, the CP 802 may divide a bandwidth 860 between the UE3 808 and the UE4 810, and transmit a downlink signal to the UE3 808 (via bandwidth resources allocated to the UE3 808) and the UE4 810 (via bandwidth resources allocated to the UE4 710) using the communication beam 850 having the adjusted width.

Still referring to FIG. 8, during at second timeslot 822, the CP 802 may devote the entire bandwidth 860 to communicate with the UE1 804 in an uplink and/or downlink direction using a communication beam 852 having a fixed width. Thereafter, the CP 802 may communicate with the UE2 806 in an uplink and/or downlink direction during a third timeslot 824 using a communication beam 854 having a fixed width. The CP 802 may devote the entire bandwidth 860 for communicating with the UE2 806 during the third timeslot 824.

In an example downlink operation, two UEs may be in near proximity to each other, e.g., an angle between the beamforming directions of the two UEs may be less than a threshold. Accordingly, a CP may schedule communication with the two UEs in different timeslots (e.g., TDMA scheduling). The CP may dedicate all bandwidth resources of a first timeslot to a first UE and all bandwidth resources of a second timeslot to a second UE. $SNR_T$ may be the SNR of the first UE and $SNR_2$ may be the SNR of the second UE. Accordingly, if the CP uses a TDMA scheduling algorithm, a total spectral efficiency may be provided by Equation (1) below:

Total spectral efficiency=$\log_2(1+SNR_1)+\log_2(1+SNR_2)$   Equation (1):

However, latency may occur caused by phase switching at the beamforming CP and the TDMA scheduling. Moreover, if an SNR is extremely large, then an SNR calculation at the CP may take into account other variables (e.g., involving self-noising). In an example, if a maximum SNR ($SNR_{max}$) is equal to 30 dB, then a useful SNR ($SNR_{true}$) for calculating the spectral efficiency may be provided by Equation (2) below:

$$SNR_{true} = f(SNR) := \frac{1}{\frac{1}{SNR_{max}} + \frac{1}{SNR}}$$   Equation (2)

Accordingly, an adjusted spectral efficiency may be provided by Equation (3) below:

Spectral efficiency=$\log_2(1+f(SNR_1))+\log_2(1+f(SNR_2))$   Equation (3)

In an aspect, the CP may schedule communication with the two UEs together in the same timeslot (e.g., FDMA scheduling) for the downlink operation. If x is a fraction of power assigned to the first UE and y is a fraction of bandwidth assigned to the first UE, then a total data rate for FDMA scheduling may be provided by Equation (4) below:

$$\text{Total data rate} = 2\left(x\log_2\left(1 + f\left(\frac{y}{x}SNR_1\right)\right) + (1-x)\log_2\left(1 + f\left(\frac{1-y}{(1-x)}SNR_2\right)\right)\right)$$   Equation (4)

In order to schedule communication with the two UEs, the CP may widen a communication beam width to encompass the beamforming directions of the two UEs. The widening of the beam width may decrease array gain but may increase spectral efficiency. In an example, L may be a loss in array gain due to the widening of the communication beam width. Accordingly, the spectral efficiency may be provided by Equation (5) below:

$$\text{Spectral efficiency} = 2\left(x\log_2\left(1 + f\left(\frac{y}{xL}SNR_1\right)\right) + (1-x)\log_2(1 + f(1-y1-xLSNR2))\right)$$   Equation (5)

In an aspect, the criterion for widening the communication beam width to encompass the beamforming directions of the two UEs is whether both UEs will gain spectral efficiency. The SNR values of the two UEs and the loss (L) in array gain due to the beam widening may be observed to determine if beam widening is proper. In an example scenario, $SNR_1$ for UE1=50 dB, $SNR_2$ for UE2=−5 dB, and L=1.5. Accordingly, UE1 may be band-limited where less power can be scheduled without losing much data rate (more bandwidth the better), and UE2 may be power-limited where less bandwidth can be scheduled without losing much data rate (more power the better). Hence, in certain cases (e.g., two UEs with particular SNR values corresponding to a particular loss (L) value), widening the beam width to communicate with the two UEs via FDMA scheduling is proper since the beam widening produces a spectral efficiency gain for both UEs.

In an aspect, an extent of the beam widening may be limited. As the beam width increases, the loss (L) in array gain increases. In an example, L=2 and the spectral efficiency for UE2 may be approximated by Equation (6) below:

$$\text{Spectral efficiency of } UE2 = 2(1-x)f\left(\frac{1-y}{(1-x)L}SNR_2\right)$$   Equation 6

If f is linear, then the spectral efficiency of UE2 using FDMA scheduling is $(1-y)SNR_2$, which is not greater than the spectral efficiency of UE2 using TDMA scheduling. As such, widening the beam width to the point where the loss in array gain is L=2 is not appropriate for UE2 because such widening does not improve the UE2's spectral efficiency. Notably, the spectral efficiency of UE1 may increase when L=2.

In an example uplink operation, the CP may control the division of bandwidth resources for two UEs. The spectral efficiency using TDMA scheduling may be provided by Equation (3) above. The spectral efficiency using FDMA scheduling may be provided by Equation (7) below:

Spectral efficiency= Equation (7)

$$2\left(x\log_2\left(1+f\left(\frac{SNR_1}{xL}\right)\right)+(1-x)\log_2\left(1+f\left(\frac{SNR_2}{(1-x)L}\right)\right)\right)$$

As with the downlink operation, for certain cases in the uplink operation (e.g., two UEs with particular SNR values corresponding to a particular loss (L) value), widening the beam width to communicate with the two UEs in the uplink via FDMA scheduling is proper since the beam widening produces a spectral efficiency gain for both UEs. In an aspect, when both UEs are power-limited, dividing bandwidth resources amongst the two UEs in the uplink will not greatly impair the UEs since SNR values for both UEs will increase as well as spectral efficiency.

Figure 9:
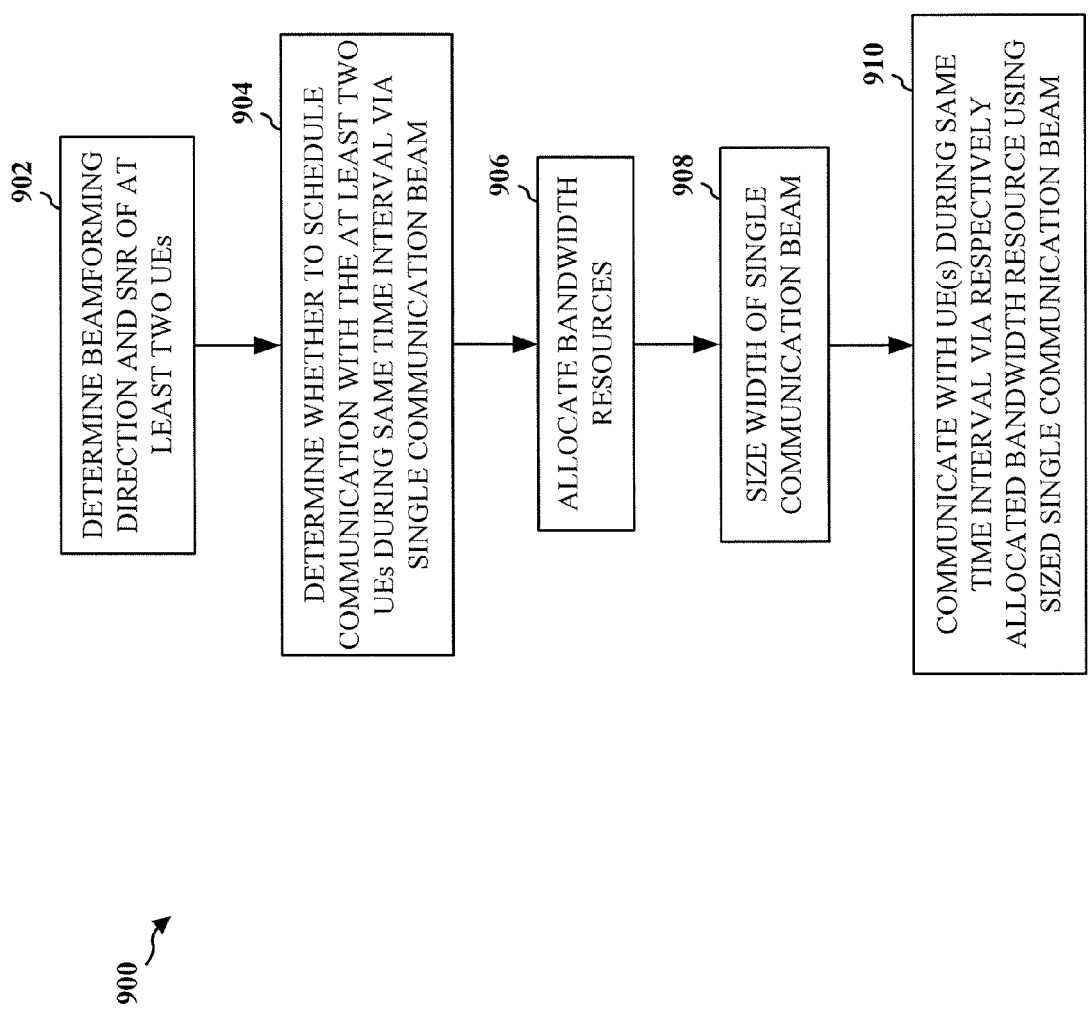
FIG. 9 is a flow chart of beamforming in a wireless communication system.

FIG. 9 is a flow chart 900 of beamforming in a wireless communication system. The method may be performed by a CP (e.g., CP 702 or CP 802). At step 902, the CP determines a beamforming direction and a signal-to-noise ratio (SNR) of at least two user equipments (UEs) (e.g., UE3 708 and UE4 710; or UE3 808 and UE4 810).

At step 904, the CP determines whether to schedule communication with the at least two UEs during a same time interval via a single communication beam based on the beamforming directions and the SNRs of the at least two UEs. In an aspect, the CP determines whether to schedule communication with the at least two UEs by measuring an angle between the beamforming direction of a first UE and the beamforming direction of a second UE, and comparing a first SNR of the first UE and a second SNR of the second UE to a SNR threshold. Accordingly, the CP determines to schedule communication with the first UE and the second UE during the same time interval via the single communication beam when the first SNR and the second SNR are greater than the SNR threshold and the measured angle is less than an angle threshold.

In another aspect, the CP determines whether to schedule communication with the at least two UEs by measuring an angle between the beamforming direction of a first UE and the beamforming direction of a second UE. When the measured angle is less than an angle threshold, the CP first determines a first spectral efficiency of the first UE and a second spectral efficiency of the second UE, if the first UE and the second UE are scheduled for communication during different time intervals via different communication beams. The first spectral efficiency may be determined based on an SNR of the first UE, and the second spectral efficiency may be determined based on an SNR of the second UE.

The CP then determines a third spectral efficiency of the first UE and a fourth spectral efficiency of the second UE, if the first UE and the second UE are scheduled for communication during the same time interval via the single communication beam. The third spectral efficiency may be determined based on an SNR of the first UE, a fraction of power assigned to the first UE, a fraction of bandwidth resources assigned to the first UE, and/or a loss in array gain of the first UE due to a width of the single communication beam. The fourth spectral efficiency may be determined based on an SNR of the second UE, a fraction of power assigned to the second UE, a fraction of bandwidth resources assigned to the second UE, and/or a loss in array gain of the second UE due to the width of the single communication beam. Thereafter, the CP determines to schedule communication with the first UE and the second UE during the same time interval via the single communication beam when the third spectral efficiency of the first UE is greater than the first spectral efficiency of the first UE and the fourth spectral efficiency of the second UE is greater than the second spectral efficiency of the second UE.

When the communication with the at least two UEs during the same time interval via the single communication beam is scheduled, the operation proceeds to step 906. At step 906, the CP allocates bandwidth resources respectively among the at least two UEs. At step 908, the CP sizes (adjusts) a width of the single communication beam to encompass the beamforming directions of the at least two UEs. In an aspect, the width of the single communication beam is sized to facilitate the third spectral efficiency being greater than the first spectral efficiency of the first UE and the fourth spectral efficiency being greater than the second spectral efficiency of the second UE.

At step 910, the CP communicates with one or more of the at least two UEs during the same time interval via a respectively allocated bandwidth resource using the sized single communication beam. The communicating may include transmitting a downlink signal to, or receiving an uplink signal from, the one or more of the at least two UEs.

Figure 10:
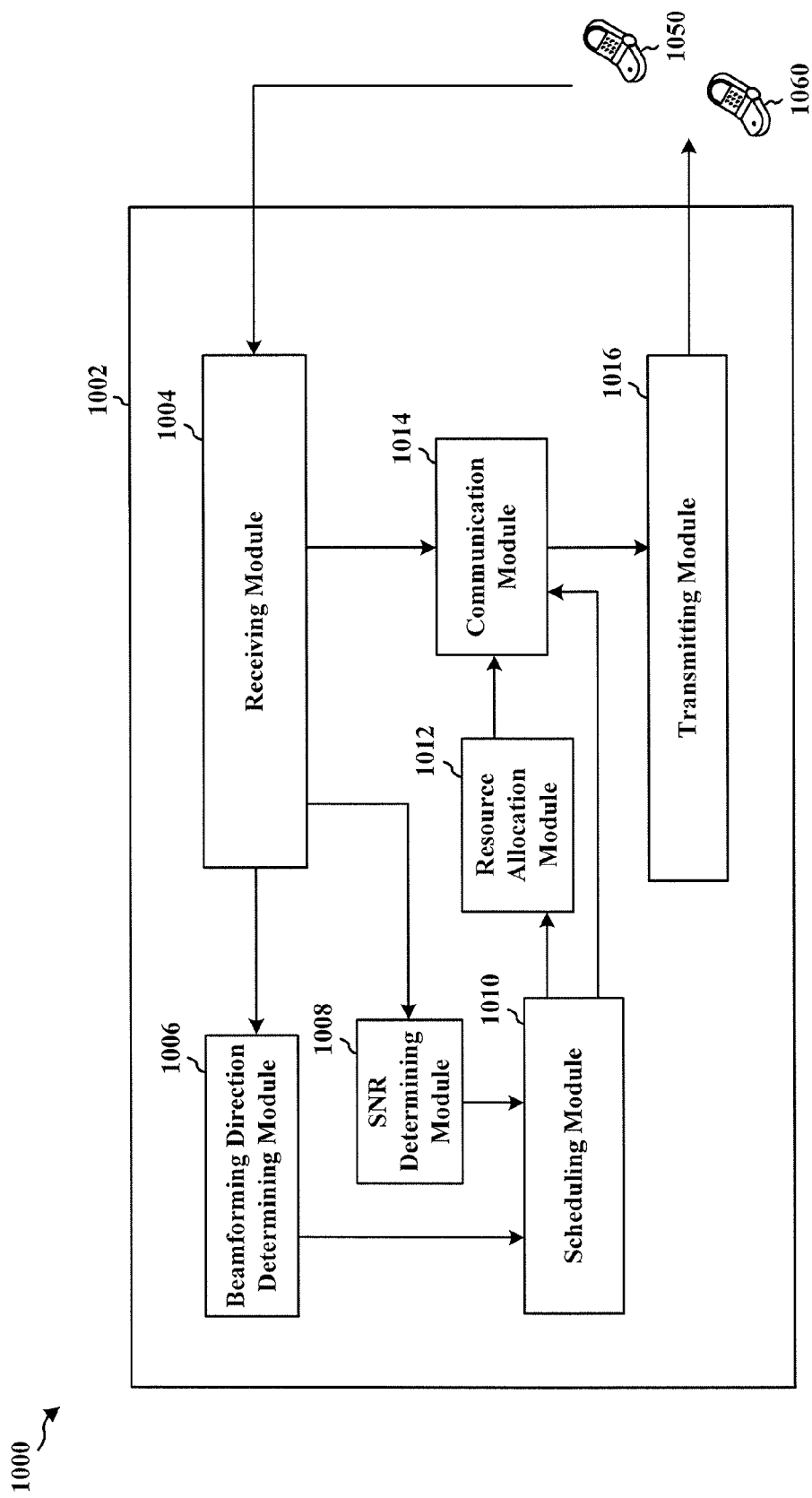
FIG. 10 is a data flow diagram illustrating the data flow between different modules/means/components in an exemplary apparatus.

FIG. 10 is a conceptual data flow diagram 1000 illustrating the data flow between different modules/means/components in an exemplary apparatus 1002. The apparatus may be a CP (e.g., CP 702 or CP 802). The apparatus includes a receiving module 1004, a beamforming direction determining module 1006, a SNR determining module 1008, a scheduling module 1010, a resource allocation module 1012, a communication module 1014, and a transmitting module 1016.

The beamforming direction determining module 1006 determines a beamforming direction of at least two user equipments (UEs) (e.g., first UE 1050 and second UE 1060). The SNR determining module 1008 determines signal-to-noise ratio (SNR) of the at least two UEs. The scheduling module 1010 determines whether to schedule communication with the at least two UEs during a same time interval via a single communication beam based on the beamforming directions and the SNRs of the at least two UEs.

In an aspect, the scheduling module 1010 determines whether to schedule communication with the at least two UEs by measuring an angle between the beamforming direction of the first UE 1050 and the beamforming direction of the second UE 1060, and comparing a first SNR of the first UE 1050 and a second SNR of the second UE 1060 to a SNR threshold. Accordingly, the scheduling module 1010 determines to schedule communication with the first UE 1050 and the second UE 1060 during the same time interval via the single communication beam when the first SNR and the second SNR are greater than the SNR threshold and the measured angle is less than an angle threshold.

In another aspect, the scheduling module 1010 determines whether to schedule communication with the at least two UEs by measuring an angle between the beamforming direction of the first UE 1050 and the beamforming direction of the second UE 1060. When the measured angle is less than an angle threshold, the scheduling module 1010 first determines a first spectral efficiency of the first UE 1050 and a second spectral efficiency of the second UE 1060, if the first UE 1050 and the second UE 1060 are scheduled for communication during different time intervals via different communication beams. The first spectral efficiency may be determined based on an SNR of the first UE 1050, and the second spectral efficiency may be determined based on an SNR of the second UE 1060.

The scheduling module 1010 then determines a third spectral efficiency of the first UE 1050 and a fourth spectral efficiency of the second UE 1060, if the first UE 1050 and the second UE 1060 are scheduled for communication during the same time interval via the single communication beam. The third spectral efficiency may be determined based on an SNR of the first UE 1050, a fraction of power assigned to the first UE 1050, a fraction of bandwidth resources assigned to the first UE 1050, and/or a loss in array gain of the first UE 1050 due to a width of the single communication beam. The fourth spectral efficiency may be determined based on an SNR of the second UE 1060, a fraction of power assigned to the second UE 1060, a fraction of bandwidth resources assigned to the second UE 1060, and/or a loss in array gain of the second UE 1060 due to the width of the single communication beam. Thereafter, the scheduling module 1010 determines to schedule communication with the first UE 1050 and the second UE 1060 during the same time interval via the single communication beam when the third spectral efficiency of the first UE 1050 is greater than the first spectral efficiency of the first UE 1050 and the fourth spectral efficiency of the second UE 1060 is greater than the second spectral efficiency of the second UE 1060.

When the communication with the at least two UEs during the same time interval via the single communication beam is scheduled, the resource allocation module 1012 allocates bandwidth resources respectively among the at least two UEs. The communication module 1014 then sizes (adjusts) a width of the single communication beam to encompass the beamforming directions of the at least two UEs. In an aspect, the width of the single communication beam is sized to facilitate the third spectral efficiency being greater than the first spectral efficiency of the first UE 1050 and the fourth spectral efficiency being greater than the second spectral efficiency of the second UE 1060.

Thereafter, the communication module 1014 communicates (via the resource module 1004 and/or the transmitting module 1016) with one or more of the at least two UEs during the same time interval via a respectively allocated bandwidth resource using the sized single communication beam. The communicating may include transmitting a downlink signal to, or receiving an uplink signal from, the one or more of the at least two UEs.

The apparatus may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
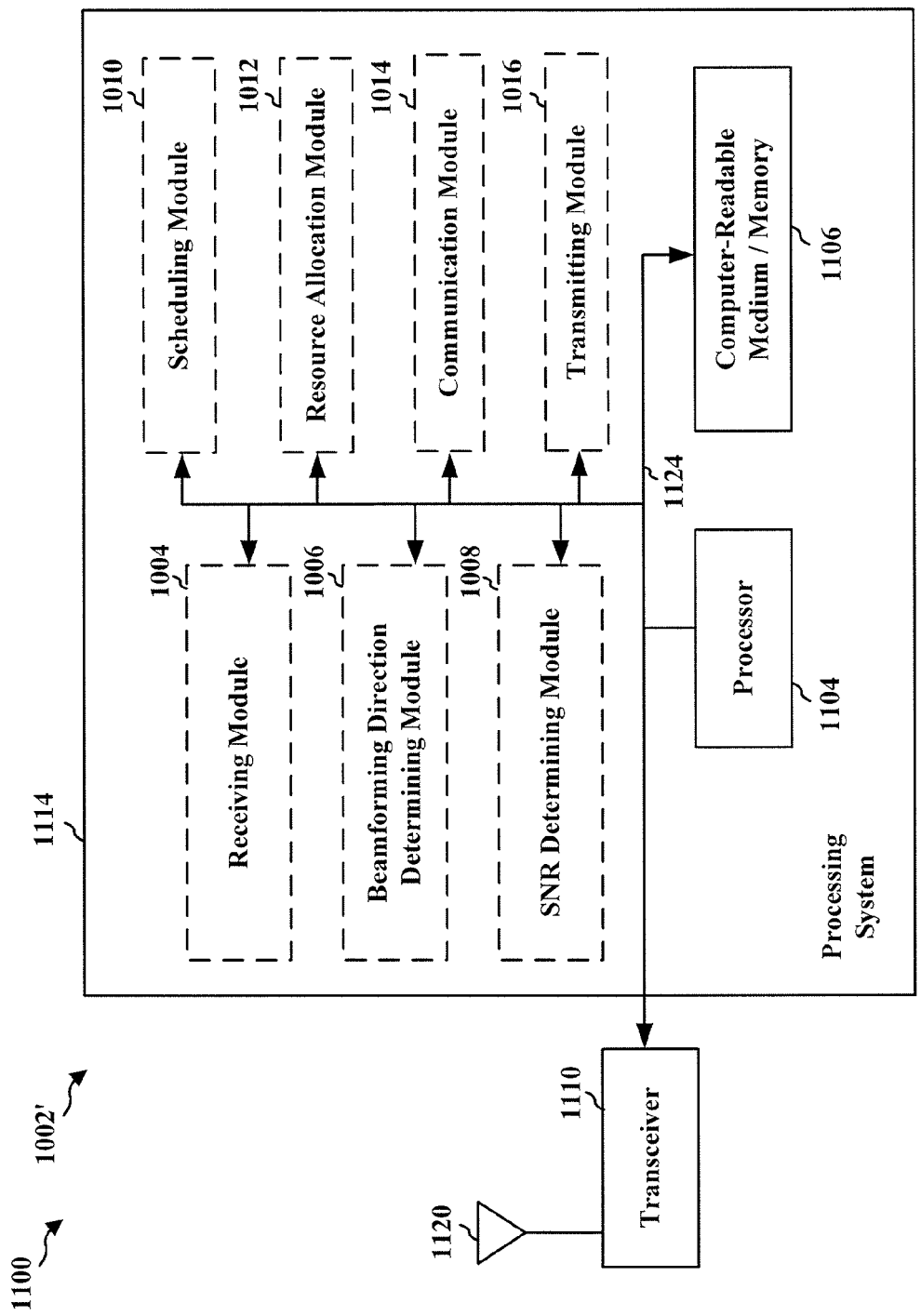
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the receiving module 1004. In addition, the transceiver 1110 receives information from the processing system 1114, specifically the transmitting module 1016, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1010, 1012, 1014, and 1016. The modules may be software modules running in the processor 1104, resident/stored in the computer readable medium/memory 1106, one or more hardware modules coupled to the processor 1104, or some combination thereof. The processing system 1114 may be a component of the base station 310 and may include the memory 376 and/or at least one of the TX processor 316, the RX processor 370, and the controller/processor 375.

In one configuration, the apparatus 1002/1002' for beamforming in a wireless communication system includes means for determining a beamforming direction and a signal-to-noise ratio (SNR) of at least two user equipments (UEs), means for determining whether to schedule communication with the at least two UEs during a same time interval via a single communication beam based on the beamforming directions and the SNRs of the at least two UEs, means for allocating bandwidth resources respectively among the at least two UEs, means for sizing a width of the single communication beam to encompass the beamforming directions of the at least two UEs, and means for communicating with one or more of the at least two UEs during the same time interval via a respectively allocated bandwidth resource using the sized single communication beam.

The aforementioned means may be one or more of the aforementioned modules of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of beamforming in a wireless communication system, comprising:
   determining a beamforming direction and a signal-to-noise ratio (SNR) of at least two user equipments (UEs);
   determining whether to schedule communication with the at least two UEs during a same time interval via a single communication beam based on the beamforming directions and the SNRs of the at least two UEs; and
   when the communication with the at least two UEs during the same time interval via the single communication beam is scheduled:
      allocating bandwidth resources respectively among the at least two UEs,
      adjusting a width of the single communication beam to encompass the beamforming directions of the at least two UEs, the beamforming directions of the at least two UEs being different, and
      communicating with one or more of the at least two UEs during the same time interval via a respectively allocated bandwidth resource using the adjusted single communication beam.

2. The method of claim 1, wherein the communicating comprises at least one of:
   transmitting a downlink signal to the one or more of the at least two UEs; or
   receiving an uplink signal from the one or more of the at least two UEs.

3. The method of claim 1, wherein the determining whether to schedule communication with the at least two UEs during the same time interval via the single communication beam comprises:
   measuring an angle between the beamforming direction of a first UE and the beamforming direction of a second UE;
   comparing a first SNR of the first UE and a second SNR of the second UE to a SNR threshold; and
   determining to schedule communication with the first UE and the second UE during the same time interval via the single communication beam when the first SNR and the second SNR are greater than the SNR threshold and the measured angle is less than an angle threshold.

4. The method of claim 1, wherein the determining whether to schedule communication with the at least two UEs during the same time interval via the single communication beam comprises:
   measuring an angle between the beamforming direction of a first UE and the beamforming direction of a second UE; and
   when the measured angle is less than an angle threshold:
      determining a first spectral efficiency of the first UE and a second spectral efficiency of the second UE if the first UE and the second UE are scheduled for communication during different time intervals via different communication beams,
      determining a third spectral efficiency of the first UE and a fourth spectral efficiency of the second UE if the first UE and the second UE are scheduled for communication during the same time interval via the single communication beam, and
      determining to schedule communication with the first UE and the second UE during the same time interval via the single communication beam when the third spectral efficiency of the first UE is greater than the first spectral efficiency of the first UE and the fourth spectral efficiency of the second UE is greater than the second spectral efficiency of the second UE.

5. The method of claim 4, wherein:
the first spectral efficiency is determined based on an SNR of the first UE; and
the second spectral efficiency is determined based on an SNR of the second UE.

6. The method of claim 4, wherein:
the third spectral efficiency is determined based on at least one of:
   an SNR of the first UE,
   a fraction of power assigned to the first UE,
   a fraction of bandwidth resources assigned to the first UE, and
   a loss in array gain of the first UE due to the width of the single communication beam; and
the fourth spectral efficiency is determined based on at least one of:
   an SNR of the second UE,
   a fraction of power assigned to the second UE,
   a fraction of bandwidth resources assigned to the second UE, and
   a loss in array gain of the second UE due to the width of the single communication beam.

7. The method of claim 4, wherein the width of the single communication beam is adjusted to facilitate the third spectral efficiency being greater than the first spectral efficiency of the first UE and the fourth spectral efficiency being greater than the second spectral efficiency of the second UE.

8. An apparatus for beamforming in a wireless communication system, comprising:
- means for determining a beamforming direction and a signal-to-noise ratio (SNR) of at least two user equipments (UEs);
- means for determining whether to schedule communication with the at least two UEs during a same time interval via a single communication beam based on the beamforming directions and the SNRs of the at least two UEs; and
- when the communication with the at least two UEs during the same time interval via the single communication beam is scheduled:
  - means for allocating bandwidth resources respectively among the at least two UEs,
  - means for adjusting a width of the single communication beam to encompass the beamforming directions of the at least two UEs based on adjusting a width of the single communication beam to encompass the beamforming directions of the at least two UEs, the beamforming directions of the at least two UEs being different, and
  - means for communicating with one or more of the at least two UEs during the same time interval via a respectively allocated bandwidth resource using the adjusted single communication beam.

9. The apparatus of claim 8, wherein the means for communicating is configured to at least one of:
- transmit a downlink signal to the one or more of the at least two UEs; or
- receive an uplink signal from the one or more of the at least two UEs.

10. The apparatus of claim 8, wherein the means for determining whether to schedule communication with the at least two UEs during the same time interval via the single communication beam is configured to:
- measure an angle between the beamforming direction of a first UE and the beamforming direction of a second UE;
- compare a first SNR of the first UE and a second SNR of the second UE to a SNR threshold; and
- determine to schedule communication with the first UE and the second UE during the same time interval via the single communication beam when the first SNR and the second SNR are greater than the SNR threshold and the measured angle is less than an angle threshold.

11. The apparatus of claim 8, wherein the means for determining whether to schedule communication with the at least two UEs during the same time interval via the single communication beam is configured to:
- measure an angle between the beamforming direction of a first UE and the beamforming direction of a second UE; and
- when the measured angle is less than an angle threshold:
  - determine a first spectral efficiency of the first UE and a second spectral efficiency of the second UE if the first UE and the second UE are scheduled for communication during different time intervals via different communication beams,
  - determine a third spectral efficiency of the first UE and a fourth spectral efficiency of the second UE if the first UE and the second UE are scheduled for communication during the same time interval via the single communication beam, and
  - determine to schedule communication with the first UE and the second UE during the same time interval via the single communication beam when the third spectral efficiency of the first UE is greater than the first spectral efficiency of the first UE and the fourth spectral efficiency of the second UE is greater than the second spectral efficiency of the second UE.

12. The apparatus of claim 11, wherein:
- the first spectral efficiency is determined based on an SNR of the first UE; and
- the second spectral efficiency is determined based on an SNR of the second UE.

13. The apparatus of claim 11, wherein:
- the third spectral efficiency is determined based on at least one of:
  - an SNR of the first UE,
  - a fraction of power assigned to the first UE,
  - a fraction of bandwidth resources assigned to the first UE, and
  - a loss in array gain of the first UE due to the width of the single communication beam; and
- the fourth spectral efficiency is determined based on at least one of:
  - an SNR of the second UE,
  - a fraction of power assigned to the second UE,
  - a fraction of bandwidth resources assigned to the second UE, and
  - a loss in array gain of the second UE due to the width of the single communication beam.

14. The apparatus of claim 11, wherein the width of the single communication beam is adjusted to facilitate the third spectral efficiency being greater than the first spectral efficiency of the first UE and the fourth spectral efficiency being greater than the second spectral efficiency of the second UE.

15. An apparatus for beamforming in a wireless communication system, comprising:
- a memory; and
- at least one processor coupled to the memory and configured to:
  - determine a beamforming direction and a signal-to-noise ratio (SNR) of at least two user equipments (UEs),
  - determine whether to schedule communication with the at least two UEs during a same time interval via a single communication beam based on the beamforming directions and the SNRs of the at least two UEs, and
  - when the communication with the at least two UEs during the same time interval via the single communication beam is scheduled:
    - allocate bandwidth resources respectively among the at least two UEs,
    - adjust a width of the single communication beam to encompass the beamforming directions of the at least two UEs based on adjusting a width of the single communication beam to encompass the beamforming directions of the at least two UEs, the beamforming directions of the at least two UEs being different, and
    - communicate with one or more of the at least two UEs during the same time interval via a respectively allocated bandwidth resource using the adjusted single communication beam.

16. The apparatus of claim 15, wherein the at least on processor is configured to communicate by:
- transmitting a downlink signal to the one or more of the at least two UEs; or
- receiving an uplink signal from the one or more of the at least two UEs.

17. The apparatus of claim 15, wherein the at least one processor is configured to determine whether to schedule communication with the at least two UEs during the same time interval via the single communication beam by:
- measuring an angle between the beamforming direction of a first UE and the beamforming direction of a second UE;
- comparing a first SNR of the first UE and a second SNR of the second UE to a SNR threshold; and
- determining to schedule communication with the first UE and the second UE during the same time interval via the single communication beam when the first SNR and the second SNR are greater than the SNR threshold and the measured angle is less than an angle threshold.

18. The apparatus of claim 15, wherein the at least one processor is configured to determine whether to schedule communication with the at least two UEs during the same time interval via the single communication beam by:
- measuring an angle between the beamforming direction of a first UE and the beamforming direction of a second UE; and
- when the measured angle is less than an angle threshold:
    - determining a first spectral efficiency of the first UE and a second spectral efficiency of the second UE if the first UE and the second UE are scheduled for communication during different time intervals via different communication beams,
    - determining a third spectral efficiency of the first UE and a fourth spectral efficiency of the second UE if the first UE and the second UE are scheduled for communication during the same time interval via the single communication beam, and
    - determining to schedule communication with the first UE and the second UE during the same time interval via the single communication beam when the third spectral efficiency of the first UE is greater than the first spectral efficiency of the first UE and the fourth spectral efficiency of the second UE is greater than the second spectral efficiency of the second UE.

19. The apparatus of claim 18, wherein:
the first spectral efficiency is determined based on an SNR of the first UE; and
the second spectral efficiency is determined based on an SNR of the second UE.

20. The apparatus of claim 18, wherein:
the third spectral efficiency is determined based on at least one of:
- an SNR of the first UE,
- a fraction of power assigned to the first UE,
- a fraction of bandwidth resources assigned to the first UE, and
- a loss in array gain of the first UE due to the width of the single communication beam; and the fourth spectral efficiency is determined based on at least one of:
- an SNR of the second UE,
- a fraction of power assigned to the second UE,
- a fraction of bandwidth resources assigned to the second UE, and
- a loss in array gain of the second UE due to the width of the single communication beam.

21. The apparatus of claim 18, wherein the width of the single communication beam is adjusted to facilitate the third spectral efficiency being greater than the first spectral efficiency of the first UE and the fourth spectral efficiency being greater than the second spectral efficiency of the second UE.

22. A non-transitory computer-readable medium storing computer-executable code for wireless communication, comprising code to:
- determine a beamforming direction and a signal-to-noise ratio (SNR) of at least two user equipments (UEs);
- determine whether to schedule communication with the at least two UEs during a same time interval via a single communication beam based on the beamforming directions and the SNRs of the at least two UEs; and
- when the communication with the at least two UEs during the same time interval via the single communication beam is scheduled:
    - allocate bandwidth resources respectively among the at least two UEs,
    - adjust a width of the single communication beam to encompass the beamforming directions of the at least two UEs, the beamforming directions of the at least two UEs being different, and
    - communicate with one or more of the at least two UEs during the same time interval via a respectively allocated bandwidth resource using the adjusted single communication beam.

* * * * *